Feb. 16, 1943.  E. G. BODEN  2,311,287

BEARING SEAL

Filed Aug. 29, 1940

INVENTOR:
Ernest G. Boden,
by Carr, Kan & Gravely,
HIS ATTORNEYS.

Patented Feb. 16, 1943

2,311,287

UNITED STATES PATENT OFFICE 2,311,287

BEARING SEAL

Ernest G. Boden, Canton, Ohio, assignor to The Timken Roller Bearing Company, Canton, Ohio, a corporation of Ohio Application August 29, 1940, Serial No. 354,673

2 Claims. (Cl. 308—187.1)

This invention relates to seals for preventing the escape of oil and grease and also for excluding dirt and other unwanted matter from bearings.

It has for its principal objects a simple, inexpensive and efficient seal of compact construction which is adapted to seal against the end surface of a bearing cup; which is resistant to wear; which is easy to mount or replace and which will have great flexibility.

Further objects are a seal adapted for use in the hub of an ordinary shop truck wheel which does not have to be removed from the axle when making repairs or replacements of the bearings and which will not be injured in changing a tire on the wheel.

The present invention is an improvement of the invention shown in my application Serial No. 300,286, for bearing seal and consists principally in the seal and mounting thereof and in the parts and combinations and arrangements of parts hereinafter described and claimed.

Figure 1:
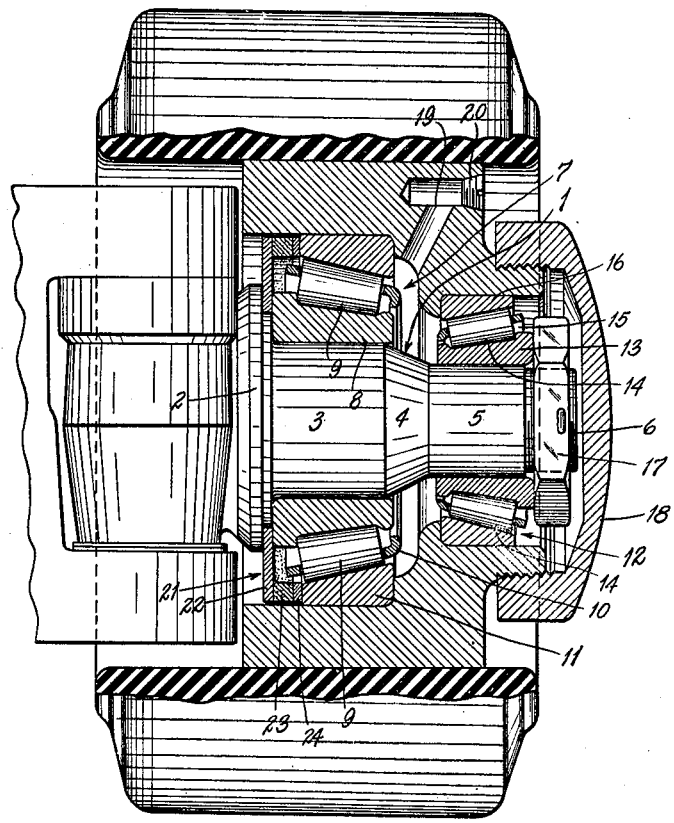
Figure 2:
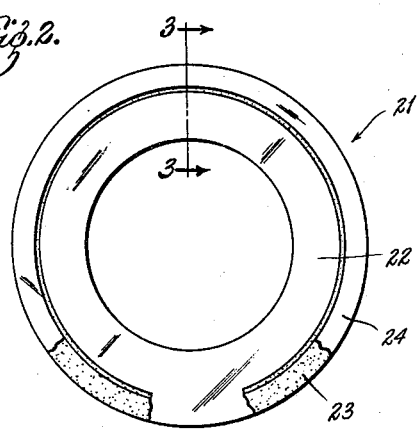
Figure 3:
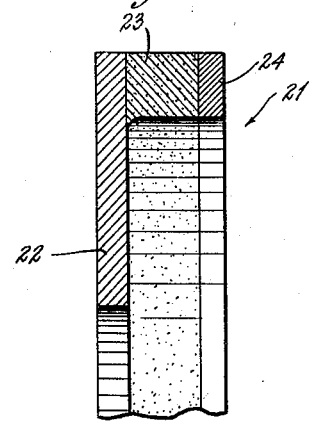

In the accompanying drawing which forms part of this specification and wherein like reference numerals refer to like parts wherever they occur, Fig. 1 is a longitudinal sectional view of the hub assembly of an electric shop truck wheel having a bearing seal therefor embodying my invention, Fig. 2 is an end view of a seal embodying my invention with a portion of the seal broken away to more clearly disclose the structure; and Fig. 3 is a sectional view taken on the line 3—3 in Fig. 2 on an enlarged scale.

In the accompanying drawing, there is illustrated the hub portion of a conventional or well known type of electric shop truck wheel. The wheel assembly comprises an axle or spindle 1 having a shoulder 2 thereon, an innermost cylindrical portion 3, a tapering portion 4, an outermost cylindrical portion 5 and a threaded end portion 6. Mounted on the innermost cylindrical portion 3 of the axle is a roller bearing, generally indicated at 7, comprising a cone 8 having a tapering raceway, a series of tapered rollers 9 mounted thereon, a suitable cage 10 for said rollers, and a bearing cup 11.

Mounted on the outermost cylindrical portion 5 of the axle is another bearing, generally indicated by 12, comprising a cone 13 having a tapering raceway, a series of tapered rollers 14 mounted thereon, a cage 15 for said rollers, and a bearing cup 16, the end of which abuts against an interior rib in the hub portion of said wheel.

The wheel is mounted on the roller bearings 7 and 12 and the assembly is retained by a nut 17 screwed on the threaded end 6 of the axle. The outermost end of the wheel is threaded, having a hub cap 18 screwed thereon. Said wheel has a lubricant passageway 19 extending therethrough which communicates with an opening between the bearings. This passageway 19 is adapted to supply lubricant to the bearings and a screw 20 serves as a plug for the outer end thereof. The construction thus far described is that of an ordinary shop truck wheel.

An oil seal, generally indicated by 21, is mounted on the spindle. This seal comprises a steel washer 22 positioned adjacent to the shoulder 2 of the spindle, said washer being tightly clamped between the shoulder 2 and the innermost end of the bearing cone 8. Bonded to this washer by vulcanizing or any other suitable means is a resilient ring 23 of any suitable elastic material such as sponge "neoprene." A sealing ring 24 of any suitable material having wear resisting properties such as "corprene" or other suitable material is vulcanized or otherwise bonded to the resilient ring 23. The seal is mounted so that the sealing ring 24 abuts against the innermost end surface of the bearing cup 11 and preferably the resilient ring 23 is compressed slightly so that the sealing ring 24 abuts tightly against the innermost end face of the cup 11 to insure maximum sealing efficiency.

The hereinbefore described invention has numerous advantages. The truck wheel may be disassembled from the axle without removing the seal. The seal eliminates the necessity of any counterbore in the hub for the seal. Under ordinary practice in bearing manufacture, the end surfaces of the bearing cups are ground, thus the sealing ring does not have to be ground to form a rubbing surface as the innermost end face of the bearing cup is used as the rubbing surface. Furthermore, with the present construction, there is no danger of the seal being damaged during tire replacements or replacement of the outer bearing.

Obviously, numerous modifications may be made and I do not wish to be limited to the precise construction shown.

What I claim is:

1. A wheel and axle assembly comprising an axle having a shoulder thereon, a wheel, a tapered roller bearing between said axle and said wheel and comprising an inner raceway member, an outer raceway member and rollers between said raceway members and tapering toward the adjacent end of the axle, and a sealing device between said shoulder and the large end of said inner raceway member, said sealing device consisting of a wide washer, a sealing ring and a ring of sponge neoprene vulcanized flatwise to both said sealing ring and the outer margin of said washer, the inside diameter of said washer being less than the outside diameter of the thick end of said inner bearing member, whereby the inner margin of said washer is clamped between said shoulder and said inner raceway member and the wheel is removable from the axle without removing the sealing device.

2. A wheel and axle assembly comprising an axle having a shoulder thereon, a wheel, a tapered roller bearing between said axle and said wheel and comprising an inner raceway member, an outer raceway member and rollers between said raceway members and tapering toward the adjacent end of the axle, and a sealing device between said shoulder and the large end of said inner raceway member, said sealing device consisting of a wide washer, a sealing ring and a compressible ring abutting flatwise against both said sealing ring and the outer margin of said washer, the inside diameter of said washer being less than the outside diameter of the thick end of said inner bearing member, whereby the inner margin of said washer is clamped between said shoulder and said inner raceway member and the wheel is removable from the axle without disassembling the bearing.

ERNEST G. BODEN.